United States Patent [19]
Boland et al.

[11] Patent Number: 5,778,928
[45] Date of Patent: Jul. 14, 1998

[54] MARINE DRAIN VALVE

[75] Inventors: John D. Boland; Gary M. Jenski, both of Jackson, Mich.

[73] Assignee: Aeroquip Corporation, Maumee, Ohio

[21] Appl. No.: 678,974

[22] Filed: Jul. 12, 1996

[51] Int. Cl.$^6$ ............................................. F16K 24/00
[52] U.S. Cl. ............................................. 137/588; 251/100
[58] Field of Search ............................ 137/588; 251/100; 222/400.7

[56] References Cited

U.S. PATENT DOCUMENTS

| | | | |
|---|---|---|---|
| 3,540,402 | 11/1970 | Kocher | 137/588 |
| 4,880,029 | 11/1989 | Koller | 251/100 |
| 5,451,031 | 9/1995 | Purvis et al. | 251/100 |

OTHER PUBLICATIONS

Aeroquip Part No. AE 99950G shown in the Aeroquip drawings dated Jul. 28, 1977.
Brochure published by Parker Hannifin Corp. showing a self-venting draing for the 500FG Series and further indentified as Part No. RK 30488 dated 1933.

*Primary Examiner*—Denise L. Ferensic
*Assistant Examiner*—John Ball
*Attorney, Agent, or Firm*—Emch, Schaffer, Schaub & Porcello, Co. L.P.A.

[57] ABSTRACT

An improved marine drain valve is disclosed. The valve includes a valve barrel having an intake opening and a discharge opening. A fluid passageway extends between the openings. A valve adaptor body surrounds the valve barrel and a torsion-compression spring is positioned between and attached to the valve barrel and the adaptor body. A vent passageway is defined by the valve for venting a reservoir to which the valve is attached. An operating pin extends outwardly from the valve barrel and is received for movement in a configured slot defined by the adaptor body. The slot has a first leg parallel to the valve barrel and a second leg extending perpendicular to the first leg. The spring urges the valve toward a nonoperating or locked position. To operate the marine drain valve, a user rotates the operating pin and forces it upwardly into the first leg of the slot thereby opening the valve. Upon release, the spring returns the operating pin to the locked position.

7 Claims, 4 Drawing Sheets

MARINE DRAIN VALVE

BACKGROUND OF THE INVENTION

The invention relates to fluid valves and more particularly to marine drain valves which can be used for removing water from fuel.

Drain valves are known in the art. The assignee of the present application has marketed a prior art oil drain valve, which is primarily used in the aerospace industry. This prior art drain valve, while somewhat similar to the drain valve of the present invention in that it included a compression and torsion spring, did not include a vent passageway as a part of the valve nor did it include an operating pin construction which is movable along a configured slot between an operating position and a locked position. This prior art valve is identified as Aeroquip Part No. AE 99950G.

Another prior art valve, is manufactured by Parker Hannifin Corporation and is designed for use with diesel and gasoline engines and includes a self venting feature. This prior art valve does not include a compression and torsion spring which urges a pin along a path between an operating position and a locked position. This prior art valve is found in the 500FG Series Fuel Filter/Water Separators and identified as Part No. RK30488.

SUMMARY OF THE INVENTION

The present invention is directed to an improved marine drain valve which includes a positive operating feature where a pin is moved along a predetermined slot path against the pressure of a compression and torsion spring by the valve user. After operation, the pin is returned by the spring to a locked position, wherein the valve is closed.

The marine drain valve includes a longitudinally extending valve barrel having a fluid intake passage adjacent one end and a fluid discharge opening adjacent a second end. The valve barrel defines a fluid passageway between the intake opening and the discharge opening. An adaptor body surrounds the valve barrel and the compression and torsion spring is positioned and connected between the valve barrel and the adaptor body. The adaptor body defines a configured slot having a first leg extending generally parallel to the valve barrel and a second leg connected to and generally perpendicular to the first leg. An operating pin extends outwardly from the valve barrel and is received in the configured slot. The compression and torsion spring urges the valve barrel and its pin to a locked or closed position. A vent passageway is defined by the valve for venting a reservoir to which the valve is attached. To operate the valve, a user must rotate the valve barrel which has an outwardly directed pin. By using the pin, the valve barrel is pushed upwardly against the spring moving the pin upwardly in the first leg of the slot to an operating position, whereby the valve is open and fluid, for example water, can be removed.

DESCRIPTION OF THE PREFERRED EMBODIMENT

Figure 1:
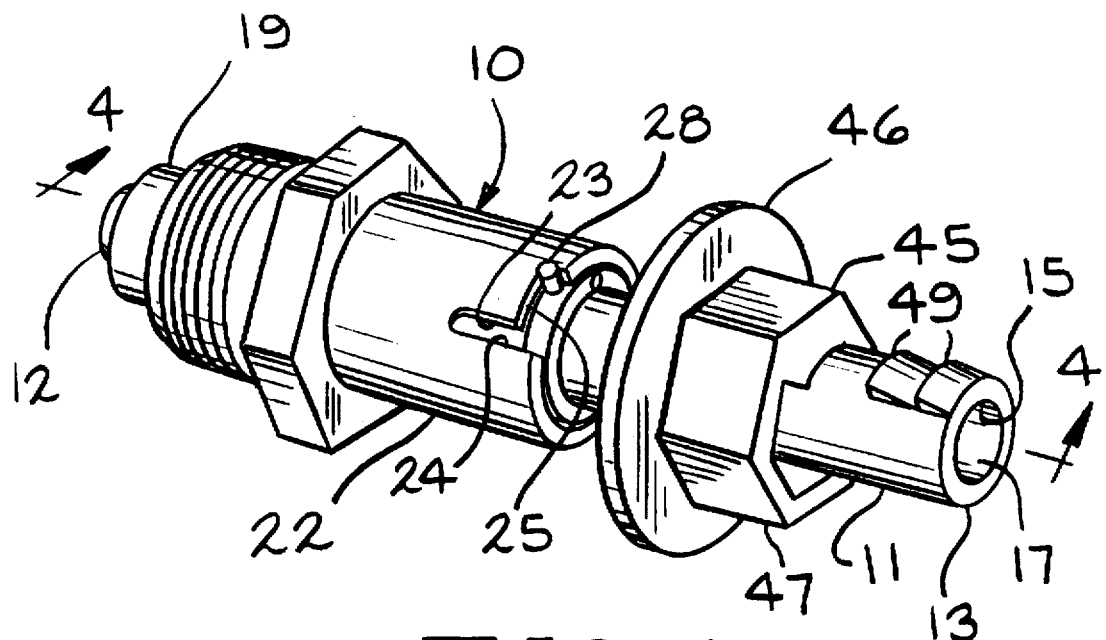
FIG. 1 is a perspective view of a marine drain valve, according to the present invention, shown in the locked or closed position.

Referring to the drawings, a drain valve such as a marine drain valve, according to the present invention, is generally indicated by the reference number 10. The marine drain valve 10 is preferably constructed of molded plastic components. The drain valve 10 includes a longitudinally extending valve barrel 11 having a first end 12 and a second end 13. The valve barrel 11 defines a fluid intake opening 14 adjacent the first end 1 2 and a fluid discharge opening 15 adjacent the second end 13.

Figure 5:
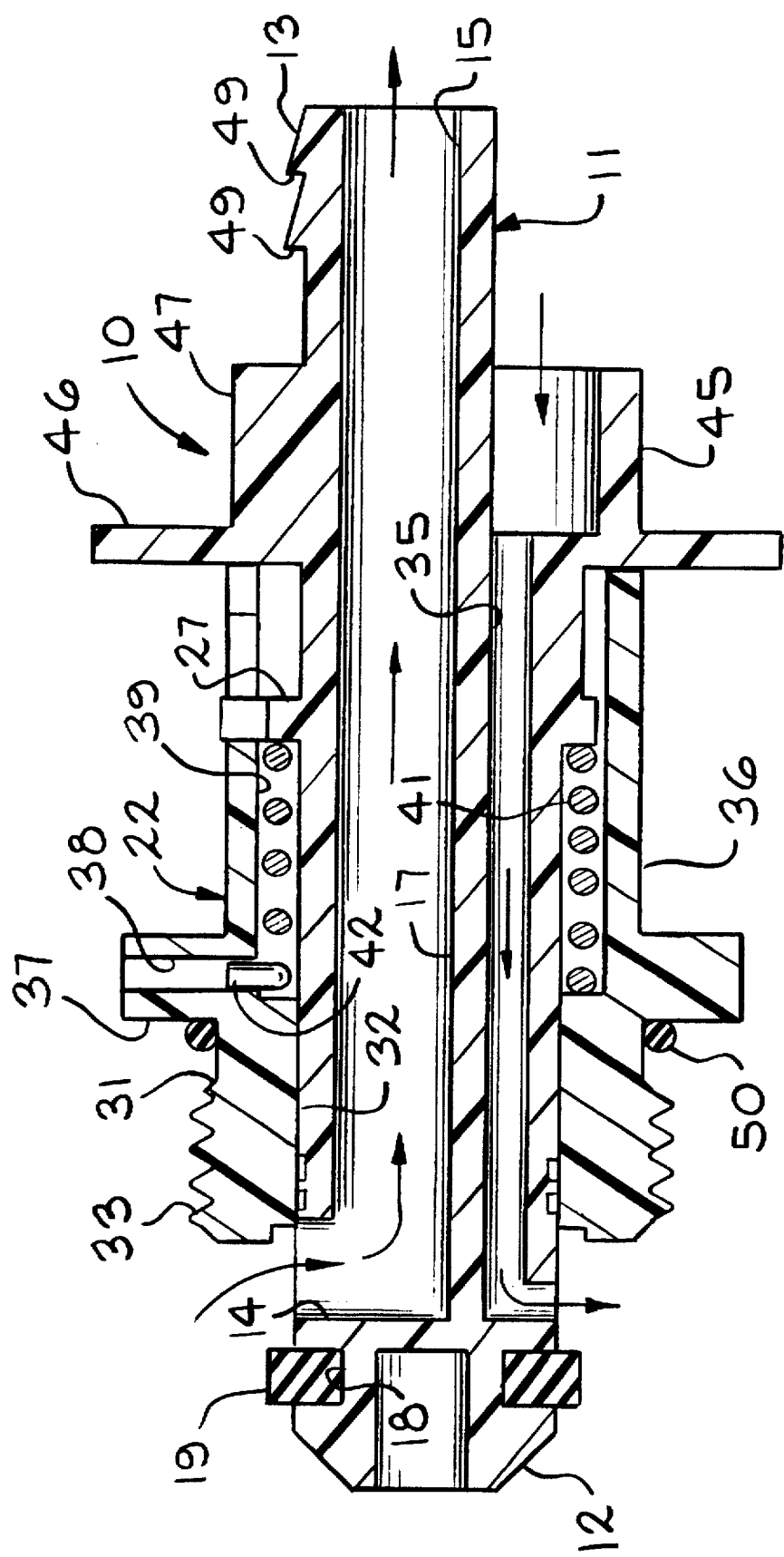
FIG. 5 is a cross-sectional view, taken along the line 5—5 of FIG. 2, shown on an enlarged scale.

The valve barrel 11 defines a longitudinally extending fluid passageway 17 between the fluid intake opening 14 and the fluid discharge opening 15. Referring to FIG. 5, the first end 12 of the valve barrel 11 defines an annular groove 18 which receives a ring seal or washer 19.

Figure 3:
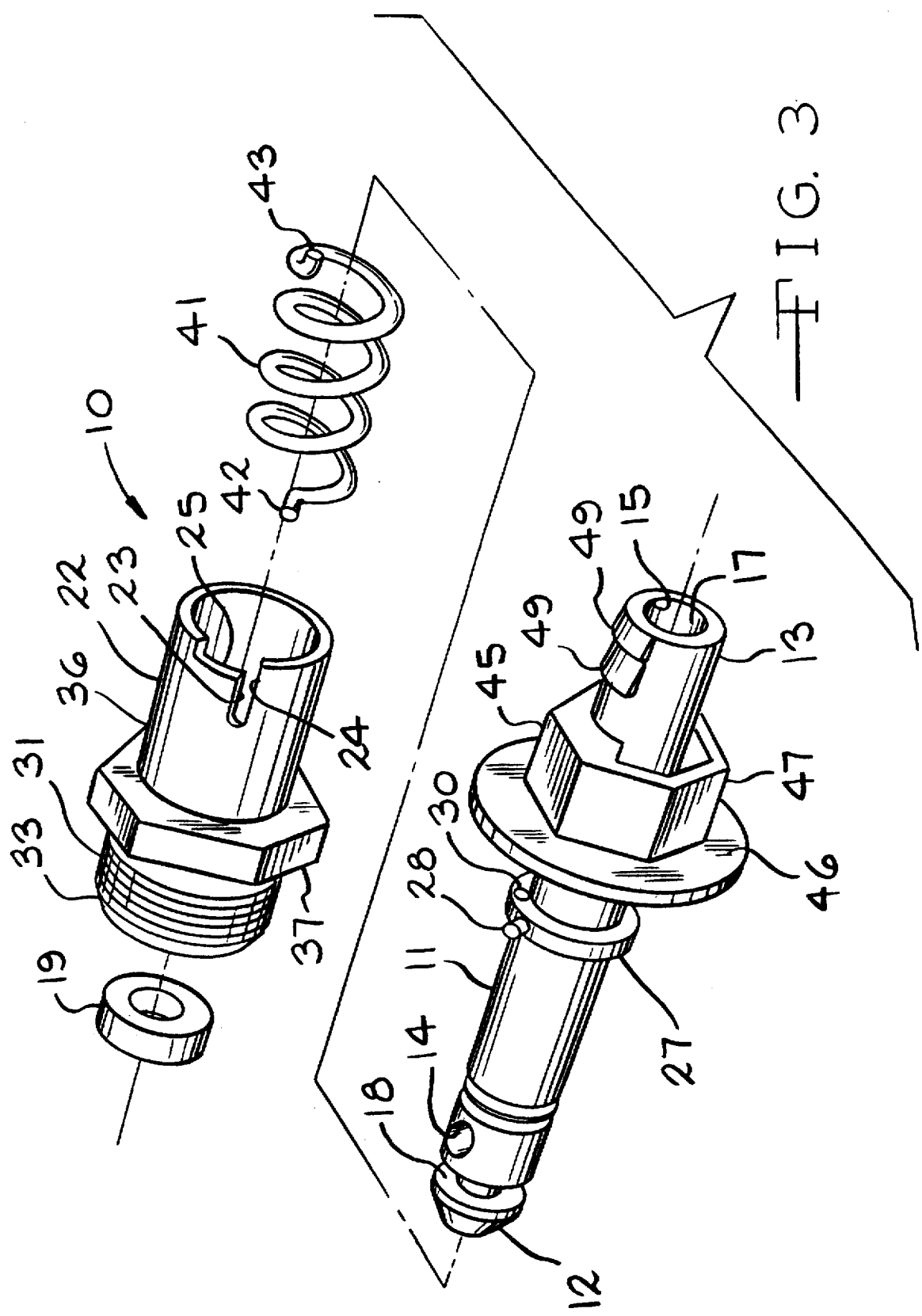
FIG. 3 is an exploded view showing the components of the marine drain valve, shown in FIGS. 1 and 2.

An adaptor body 22 surrounds the valve barrel 11. The ring seal 19 engages the adaptor body 22 when the valve is in the locked position. Referring to FIGS. 1 and 3, the adaptor body 22 defines a contoured slot 23 having a first leg 24 extending generally parallel to the longitudinal axis of the valve barrel 11 and a second leg 25 which is connected to and is generally perpendicular to the first leg 24. Referring to FIG. 3, an annular shoulder 27 is provided on the valve barrel 11 and mounts a radially extending operating pin 28. The annular shoulder 27 also defines an opening 30.

The adaptor body 22 includes a front portion 31 which has a surface 32 positioned adjacent the valve barrel 11. The front portion 31 of the adaptor body 22 defines a plurality of threads 33 on the exterior of the front portion 31. The threads 33 are used to connect the marine drain valve 10 to a reservoir, for example to a marine fuel filter/water separator bowl.

An important feature of the present invention is a longitudinally extending vent passageway 35 which extends from a point below the second end 13 of the valve barrel 11 to a point above the first end 12. When the drain valve 10 is connected to a fluid reservoir by the threads 33, the vent passageway 35 vents the reservoir to atmosphere.

Figure 4:
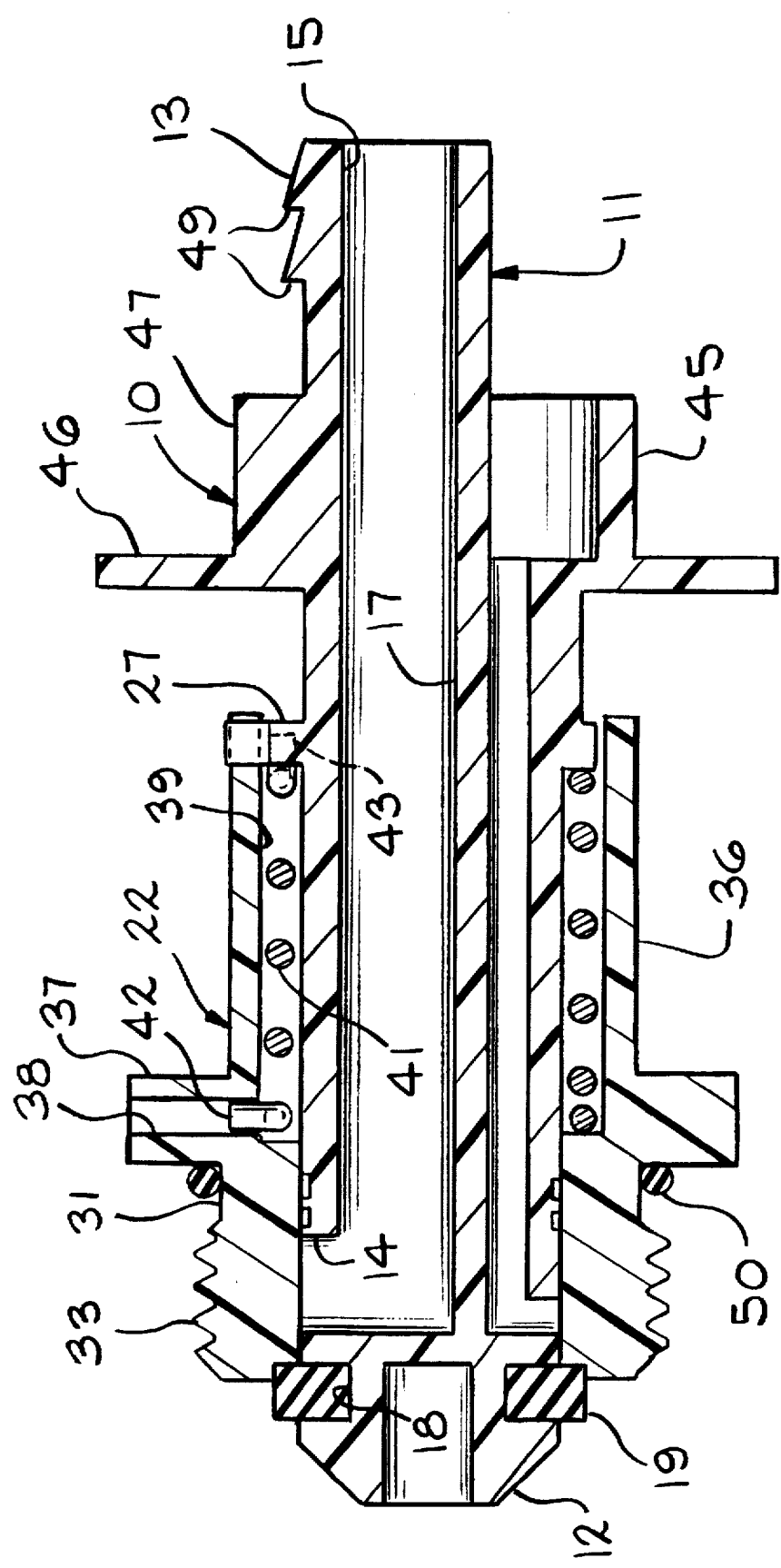
FIG. 4 is a cross-sectional view, taken along the line 4—4 of FIG. 1, shown on an enlarged scale.

A second portion 36 of the adaptor body 22 includes a wrench flat shoulder 37. Referring to FIG. 5, an opening 38 is provided in the wrench flat shoulder 37. As best shown in FIGS. 4 and 5, the second portion 36 of the adaptor body 22 and the exterior of the valve barrel 11 define a spring chamber 39. A compression and torsion spring 41 having a first end 42 and a second end 43 surrounds the valve barrel 11 and is received in the spring chamber 39. The first end 42 of the spring 41 is received in the opening 38 defined in the wrench flat shoulder 37. The second end 43 of the spring 41 is received and held in the opening 30 defined by the annular shoulder 27 of the valve barrel 11. The torsion and compression spring 41 and the holding of the ends 42 and 43 are very important in the operation of the drain valve 10, as will be explained below. An O-ring 50 is mounted on the adaptor body 22 adjacent the threads 31. The O-ring 50 provides a seal between the drain valve 10 and the reservoir.

A rear portion 45 of the valve barrel 11 includes an integral operating ring 46 and an adjacent hexagonal shoulder 47. In the present embodiment, the rear portion 45 of the valve barrel 11 defines a plurality of spaced tube shoulders 49 adjacent the second end 13. The spaced shoulders 49 are used to retain a hose (not shown) in surrounding relationship to the second end 13 of the valve barrel 11.

Figure 2:
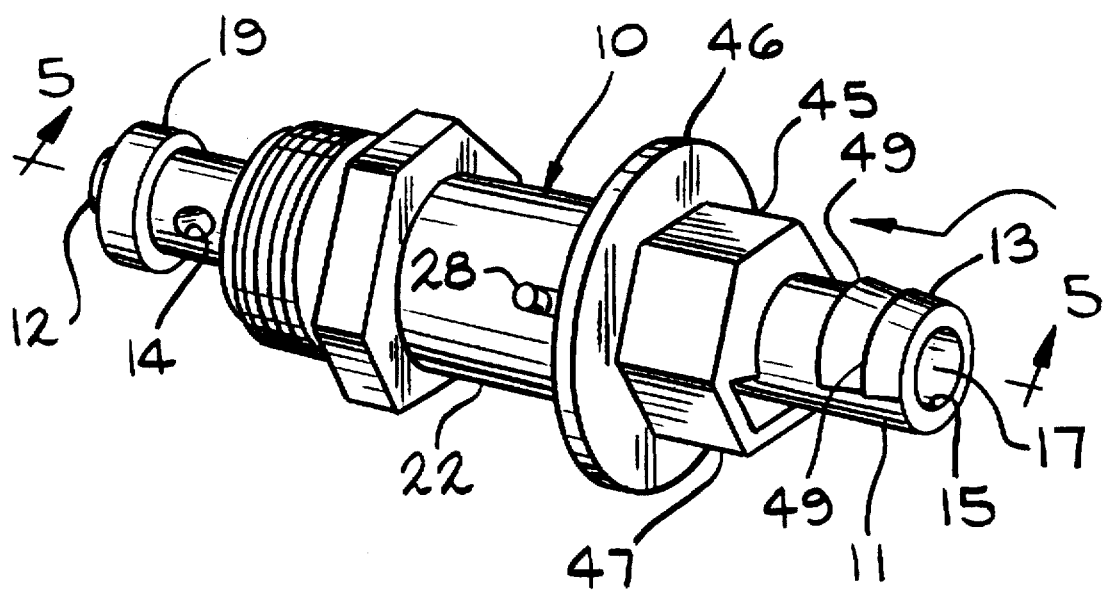
FIG. 2 is a perspective view showing the marine drain valve, according to the present invention, in the operating or open position.

In operation, an important feature of the marine drain valve 10, is that the valve is continually urged toward its closed or locked position shown in FIGS. 1 and 4. This occurs because the ends 42 and 43 of the torsion and compression spring 41 are held by the adaptor body 22 and the valve barrel 11, respectively. When the valve 10 is in its unlocked or open position shown in FIGS. 2 and 5 fluid, such as water, is free to flow into the fluid intake opening 14, through the fluid passageway 17 and through the fluid discharge opening 15. When this occurs, the operator has his or her hand adjacent the second end 13 and is generally pushing on the operating ring 46 urging the valve to its open position. As shown in FIG. 2, the operating pin 28 has been forced along the first leg 24 of the contoured slot 23, as best shown in FIG. 2.

Upon release by the operator, the torsion and compression spring 41 urges the pin 28 toward the second leg 25 of the contoured slot 23. When the pin 28 is forced by the spring into the second leg 25, the torsional force of the spring rotates the pin moving it to the nonoperating locked position shown in FIG. 1. It has been found that this spring-pin type positive closing feature together with the vent passageway from the fuel reservoir to atmosphere provides an improved marine drain valve.

Many revisions may be made to the above described preferred embodiment without departing from the scope of the invention or from the following claims.

We claim:

1. A marine drain valve having a first and second end comprising a longitudinally extending valve barrel, a fluid intake opening adjacent said first end and a fluid discharge opening adjacent said second end, said valve barrel defining a fluid passageway between said fluid intake opening and said fluid discharge opening, an adapter body surrounding said valve barrel, a compression and torsion spring connected between said valve barrel and said adapter body, said adapter body defining a slot having a first leg extending generally parallel to said valve barrel, said adapter body defining a second leg connected to and generally perpendicular to said first leg, said first leg being continuous with said second leg, a pin positioned in said slot and connected to said valve barrel, said pin extending radially outwardly from said valve barrel, said pin having an outward end positioned in said slot and an inward end connected to said valve barrel, said pin being movable between an operating position in said first leg and a locked position in said second leg, said compression and torsion spring urging said valve barrel and said pin to said locked position in said second leg of said slot, said fluid intake opening being closed when said pin is in said locked position, said valve defining a vent passageway extending between said first end and said second end.

2. A marine drain valve, according to claim 1, wherein said adaptor body covers said fluid intake opening when said pin is in said locked position.

3. A marine drain valve, according to claim 2, wherein said first end of said valve barrel mounts a ring seal which engages said adaptor body when said pin is in said locked position.

4. A marine drain valve, according to claim 1, wherein said valve barrel defines said vent passageway which extends between said first end and said second end.

5. A marine drain valve, according to claim 4, including a wrench flat shoulder integrally mounted on said adapter body.

6. A marine drain valve, according to claim 5, wherein said adaptor body defines a plurality of threads adjacent said wrench flat shoulder for connection to a marine fuel reservoir.

7. A marine drain valve, according to claim 4, wherein said valve barrel defines a plurality of spaced tube shoulders adjacent said second end.

\* \* \* \* \*